(12) United States Patent
Chapman et al.

(10) Patent No.: US 8,359,579 B2
(45) Date of Patent: Jan. 22, 2013

(54) MONITORING DYNAMIC ASPECT ORIENTED APPLICATIONS AT EXECUTION TIME

(75) Inventors: Matthew Paul Chapman, Eastleigh (GB); Adrian Mark Colyer, Southampton (GB); Benjamin John Dalziel, Liverpool (GB)

(73) Assignee: International Business Machines Corporation, Armonk, NY (US)

( * ) Notice: Subject to any disclaimer, the term of this patent is extended or adjusted under 35 U.S.C. 154(b) by 1537 days.

(21) Appl. No.: 11/556,768

(22) Filed: Nov. 6, 2006

(65) Prior Publication Data

US 2007/0124723 A1    May 31, 2007

(30) Foreign Application Priority Data

Nov. 26, 2005    (GB) .................................. 0524112.0

(51) Int. Cl.
*G06F 9/44*    (2006.01)
(52) U.S. Cl. .................... 717/127; 717/124; 717/131
(58) Field of Classification Search .................. None
See application file for complete search history.

(56) References Cited

U.S. PATENT DOCUMENTS

| 6,115,544 | A * | 9/2000 | Mueller ........................... 714/57 |
| 7,168,009 | B2 * | 1/2007 | Darringer et al. ............. 714/38.1 |
| 7,284,274 | B1 * | 10/2007 | Walls et al. ..................... 726/25 |
| 2004/0123187 | A1 * | 6/2004 | Colyer ............................. 714/38 |

OTHER PUBLICATIONS

Mahrenholz et al. "Program Instrumentation for Debugging and Monitoring with AspectC++", 2002, Fifth IEEE International Symposium on Object-Oriented Real-Time Distributed Computing.*
Ishio et al. "Debugging Support for Aspect-Oriented Program Based on Program Slicing and Call Graph", 2004, 20th IEEE International Conference on Software Maintenance.*
Artho et al. "Combined Static and Dynamic Analysis", May 2005, Electronic Notes in Theoretical Computer Science, vol. 131.*
Haupt et al., "An Execution Layer for Aspect-Oriented Programming Languages", Jun. 2005, VEE'05.*
D'Amorim et al., "Event-based Runtime Verification of Java Programs", Jul. 2005, Proceedings of the third international workshop on dynamic analysis.*

* cited by examiner

*Primary Examiner* — Chat Do
*Assistant Examiner* — Jue Wang
(74) *Attorney, Agent, or Firm* — Yee & Associates, P.C.; David A. Mims, Jr.

(57) ABSTRACT

A method for generating one or more satisfaction records for an expression in a software application, the expression including at least one criterion relating to the application wherein the satisfaction of the criterion can be determined only at application execution time, the method comprising: analyzing the application to generate a first set of locations in the application where the at least one criterion is potentially satisfied; executing the application; monitoring the application to generate a second set of locations in the application where the at least one criterion is actually satisfied; for each location in the second set of locations generating a satisfaction record indicating that the application satisfied the at least one criterion at the location; and for each location in the first set not in the second set generating a satisfaction record indicating that the application did not satisfy the at least one criterion at the location.

9 Claims, 5 Drawing Sheets

MONITORING DYNAMIC ASPECT ORIENTED APPLICATIONS AT EXECUTION TIME

FIELD OF THE INVENTION

The present invention relates to the monitoring of aspect oriented applications at execution time. In particular, it relates to monitoring the satisfaction of dynamic aspect oriented criteria at execution time.

BACKGROUND OF THE INVENTION

Aspect oriented programming (AOP) is a software development paradigm for providing application code which accurately reflects an application design. In this way AOP provides for simplified application development and maintenance. AOP achieves this by recognising how aspects of an application, known as "concerns", can cut across the entire application. For example, concerns such as security, tracing and logging can be fundamental to application design and can affect most or all of an application. AOP allows for such concerns to be extracted and designed independently of other concerns, whilst being implemented in a way which potentially affects an entire application as appropriate. Concrete means for achieving these objectives include join points, pointcut expressions and advice. These means and associated techniques are considered in detail in existing AOP literature such as the "AspectJ Programming Guide" (available at eclipse.org/aspectj/doc/progguide/index.html) and are further considered below (AspectJ is a registered trademark of Palo Alto Research Center Incorporated).

One technology for employing AOP in software development is known as AspectJ. AspectJ provides for the compilation of aspect oriented applications in the Java language (Java is a registered trademark of Sun Microsystems). The conventions and program fragments used herein generally relate to AspectJ, although it will be apparent to those skilled in the art that the concepts and techniques are equally applicable to the generic field of AOP and any particular aspect oriented software development implementation.

A join point in a software application is a well-defined point in a program flow. For example, the action of an object receiving a method call is a clearly-definable point in a program flow, and is known as a method call join point. Other examples of join points include the execution of a method body, a reference to a field or the execution of an exception handler. Join points can be identified and used in an aspect oriented application through a definition of an expression known as a pointcut. For example, a pointcut defined as:

pointcut radiusUpdate( ):call(void Circle.setRadius
        (long))

relates to each join point that is a call to a method having the signature "Circle.setRadius(long)". Once defined, pointcuts are used to provide code, known as advice, which can be executed at runtime when a join point is reached.

Although join points defined by pointcut expressions are all logically determined at runtime, it is sometimes possible to determine at compile time those join points that will be matched by a pointcut expression when the application is later executed. For example, with a pointcut expression which matches calls to a method with a certain name the matches can be fully determined at compile time because the names of methods in the application are known. Such pointcut expressions are known as static pointcut expressions. However, sometimes the matches cannot be fully determined at compile time. For example, a pointcut expression might match calls to a method which is passed an object parameter that is an instance of a particular class. In the general case it is not possible to fully determine the matches at compile time because the runtime instance of an object cannot always be inferred from the source code. Pointcut expressions such as this are referred to as dynamic pointcut expressions.

In order to effectively develop aspect-oriented applications, good tooling support is required. This can help developers by indicating where parts of an application are going to be affected by advice at runtime. An example of such tooling is AJDT (AspectJ Development Tools). For static pointcut expressions the tooling can show the exact matches within source code, but this is not possible for dynamic pointcut expressions. Currently AJDT indicates all potential matches of a dynamic pointcut expression with a particular marker icon to indicate that there is an additional runtime test to determine the exact matches. However, this cannot help developers understand the case where the pointcut is not matching the required places at runtime.

It would therefore be advantageous to provide a mechanism for identifying where a dynamic pointcut expression is satisfied and, in particular, where the dynamic pointcut expression could be satisfied but is not satisfied in application code. This is an established need, as is considered, for example, in the paper written by Katharina Mehner and Awais Rashid entitled "Towards a Standard Interface for Runtime Inspection in AOP Environments" available on the world wide web at www.comp.lancs.ac.uk/computing/aose/papers/FASOP_AOSDTOOLSWS2002.pdf).

SUMMARY OF THE INVENTION

The present invention accordingly provides, in a first aspect, a method for generating one or more satisfaction records for an expression in a software application, the expression including at least one criterion relating to the application wherein the satisfaction of the criterion can be determined only at application execution time, the method comprising the steps of: analysing the application to generate a first set of locations in the application where the at least one criterion is potentially satisfied; executing the application; monitoring the application to generate a second set of locations in the application where the at least one criterion is actually satisfied; for each location in the second set of locations generating a satisfaction record indicating that the application satisfied the at least one criterion at the location; and for each location in the first set of locations not in the second set of locations generating a satisfaction record indicating that the application did not satisfy the at least one criterion at the location.

Thus, each satisfaction record includes an indicator as to whether an associated location in the application code does or does not actually satisfy the dynamic pointcut expression. Such information is valuable to developers of application code and aspect code to inform their understanding of how aspect code affects application code when linked and executed.

Preferably the expression is a dynamic pointcut expression.

Preferably the steps of analysing, monitoring and generating are undertaken by aspect code linked to the software application by an aspect linker.

Preferably the method further comprises the step of providing an identifier in source code for the software application for each one of the satisfaction records at a location in the source code corresponding to the satisfaction record.

Preferably each identifier includes a corresponding satisfaction record indicator.

The present invention accordingly provides, in a second aspect, a system for generating one or more satisfaction records for an expression in a software application, the expression including at least one criterion relating to the application wherein the satisfaction of the criterion can be determined only at application execution time, the system comprising: an analyser for analysing the application to generate a first set of locations in the application where the at least one criterion is potentially satisfied; an executor for executing the application; a monitor for monitoring the application to generate a second set of locations in the application where the at least one criterion is actually satisfied; for each location in the second set of locations, a generator for generating a satisfaction record indicating that the application satisfied the at least one criterion at the location; and for each location in the first set of locations not in the second set of locations a generator for generating a satisfaction record indicating that the application did not satisfy the at least one criterion at the location.

The present invention accordingly provides, in a third aspect, an apparatus comprising: a central processing unit; a memory subsystem; an input/output subsystem; and a bus subsystem interconnecting the central processing unit, the memory subsystem, the input/output subsystem; and the system described above.

The present invention accordingly provides, in a fourth aspect, a computer program element comprising computer program code to, when loaded into a computer system and executed thereon, cause the computer to perform the steps of a method as described above.

BRIEF DESCRIPTION OF THE DRAWINGS

A preferred embodiment of the present invention will now be described, by way of example only, with reference to the accompanying drawings, in which.

DETAILED DESCRIPTION OF THE PREFERRED EMBODIMENT

Figure 1:
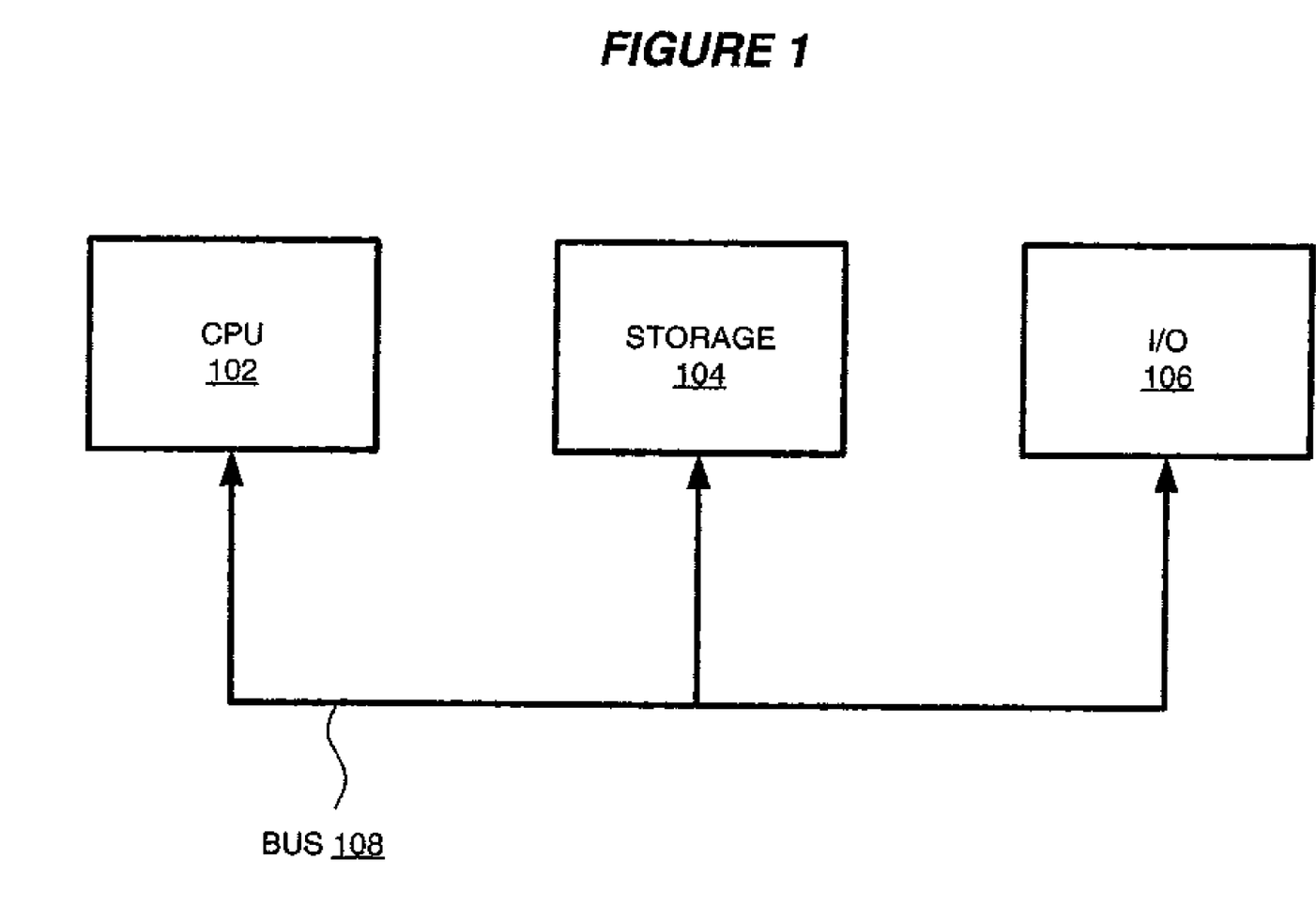
FIG. 1 is a block diagram of a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
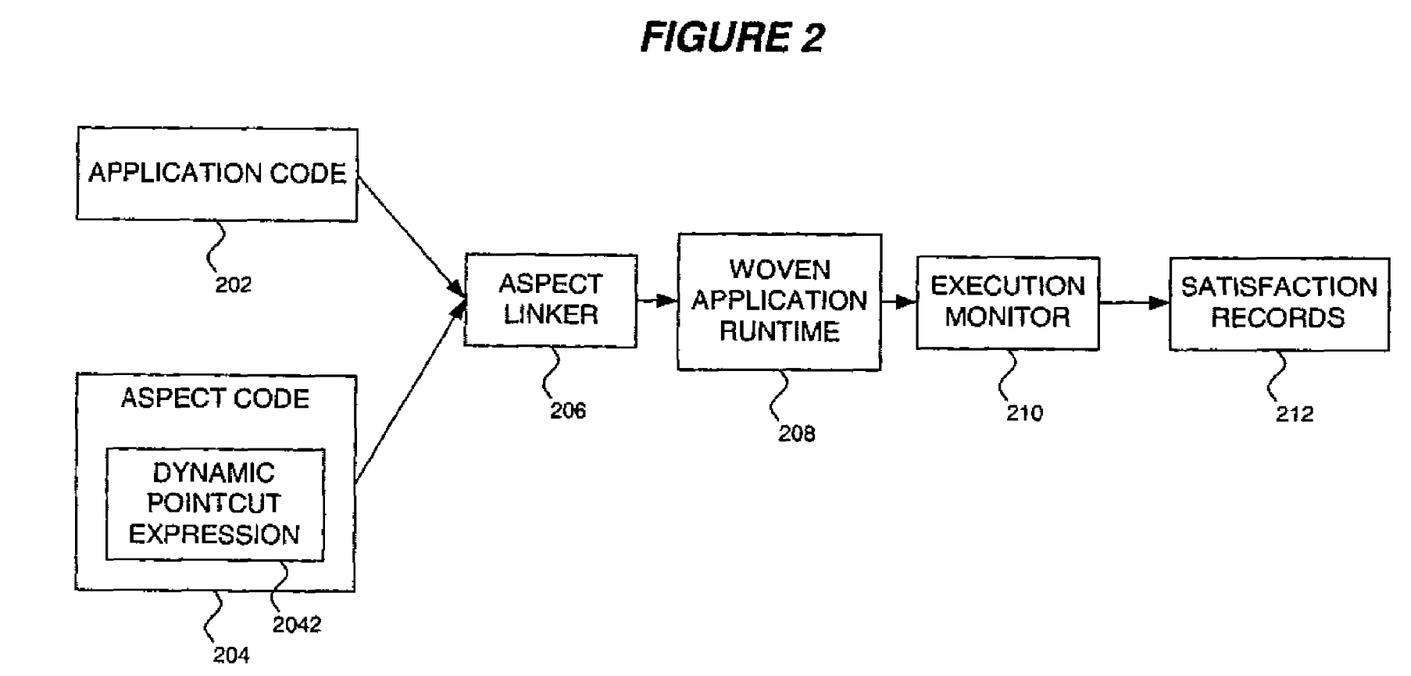
FIG. 2 is a block diagram illustrating a mechanism for identifying where a dynamic pointcut expression is or is not satisfied in accordance with a preferred embodiment of the present invention.

FIG. 2 is a block diagram illustrating a mechanism for identifying where a dynamic pointcut expression 2042 is or is not satisfied in accordance with a preferred embodiment of the present invention. Application code 202 for a software application is generated by a software compiler, such as a Java compiler. In parallel, aspect code 204 is generated by an aspect compiler such as the AspectJ compiler "ajc". Aspect code 204 includes definitions of one or more dynamic pointcut expressions 2042 having associated advice (not illustrated). The dynamic pointcut expression 204 defines at least one criterion relating to the application, and the pointcut expression 204 is dynamic in that the satisfaction of the criterion can be determined only at application execution time. The dynamic pointcut expression 204 thus captures join points in the application code 202.

The application code 202 and the aspect code 204 are linked by an aspect linker 206. For example, the aspect linker 206 can be the AspectJ linker. Aspect linking is often referred to as "weaving". Following linking by the aspect linker 206, a woven application runtime 208 is generated corresponding to the application code 202 with the addition of advice from the aspect code 204 in accordance with the dynamic pointcut expression 2042. Alternatively, a single tool can be used to undertake the functions of each or any of an application compiler to generate the application code 202, an aspect compiler to generate the aspect code 204, and the aspect linker 206. For example, the AspectJ compiler "ajc" is able to undertake all of these functions.

In this way, the woven application runtime 208 is generated including both application code 202 and aspect code 204 in accordance with the dynamic pointcut expression 2042 and associated advice. The woven application runtime is processable by an execution monitor 210. The execution monitor 210 is a software or hardware component for generating one or more satisfaction records 212. The execution monitor 210 executes the woven application runtime 208 and monitors the execution to determine locations in the application code where the dynamic pointcut expression 2042 is potentially and actually satisfied. Each of the satisfaction records 212 corresponds to a location in the application code where the dynamic pointcut expression 2042 is satisfied, or where it is potentially satisfied but not actually satisfied.

The dynamic pointcut expression 2042 is fully determinate only at application execution time. Thus, it is not possible to determine exactly which locations in the application code 202 satisfy the dynamic pointcut expression 2042 until execution time (this is known as actual satisfaction). However, it is possible to identify all of the locations in the application code 202 where the dynamic pointcut expression 2042 is potentially satisfied by analysis of the application code 202 without execution (this is known as potential satisfaction). For example, a dynamic pointcut expression including a criterion that a particular method is passed an argument being an instance of a particular class is not fully determinate until execution time because the class of an argument cannot be confirmed until execution (due to polymorphism). However, it is possible to identify all locations where an argument which could potentially be an instance of the specific class is passed to the method. Thus, actual satisfaction for a dynamic pointcut expression 2042 cannot be determined until application execution time, although potential satisfaction can be determined before execution time.

Figure 3:
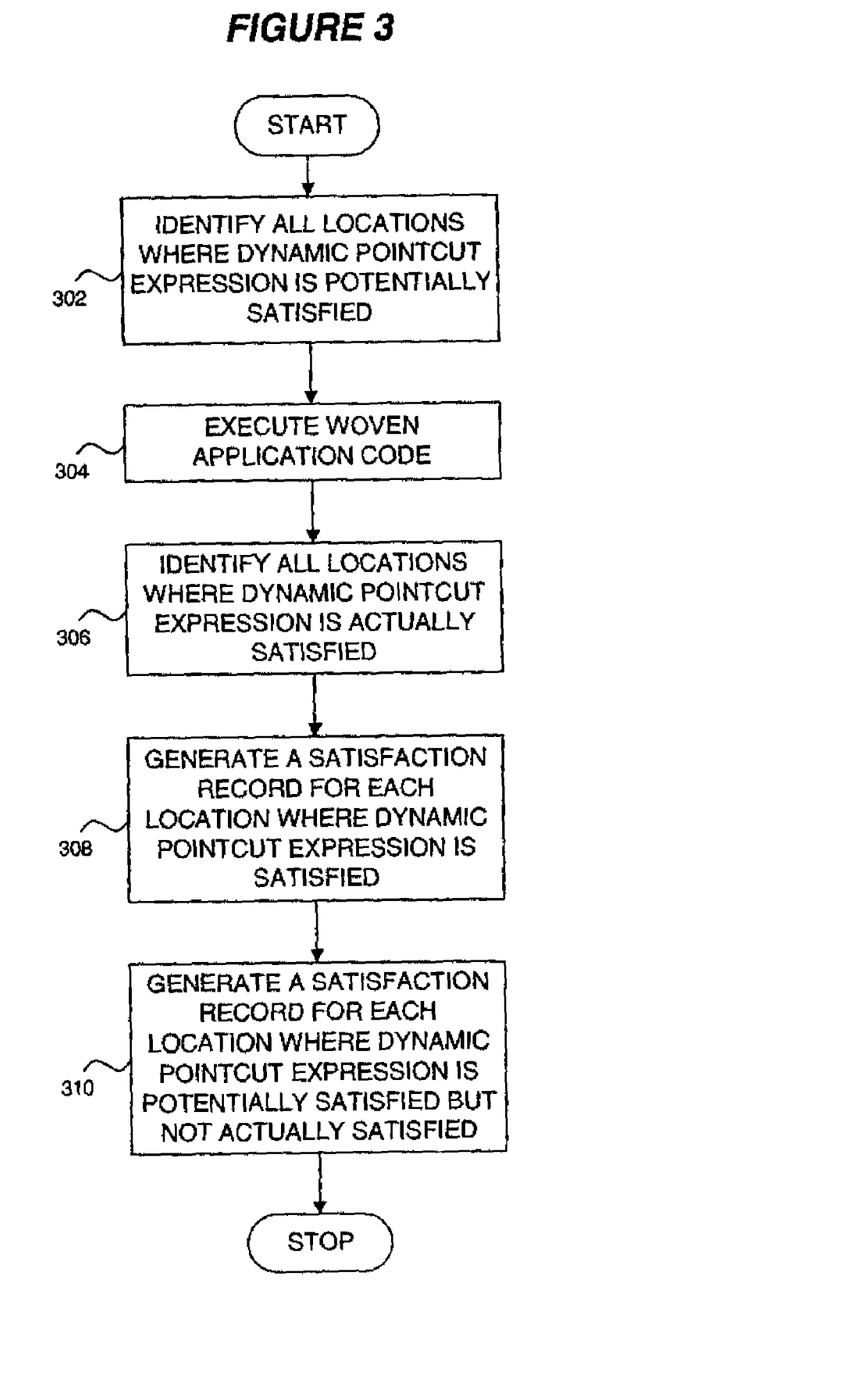
FIG. 3 is a flowchart illustrating a method of the execution monitor of FIG. 2 in accordance with a preferred embodiment of the present invention.

FIG. 3 is a flowchart illustrating a method of the execution monitor 210 of FIG. 2 in accordance with a preferred embodiment of the present invention. At step 302 the method identifies all locations in the application code 202 where the dynamic pointcut expression 2042 is potentially satisfied. This facility is provided by tools known in the art such as AJDT (AspectJ Development Tools). At step 304 the method instigates the execution of the woven application code 202. At step 306 the method monitors the woven application code 202 during execution to identify locations in the application code 202 where the dynamic pointcut expression 2042 is actually satisfied. At step 308 the method generates a satisfaction record 212 for each identified location in the application code 202 where the pointcut expression 2042 is actually satisfied, indicated as being actually satisfied. At step 310 the method generates a satisfaction record 212 for each identified location in the application code 202 where the pointcut expression 2042 is potentially satisfied but not actually satisfied, indicated as being not actually satisfied. In this way, the method of FIG. 3 is functional to generate a set of satisfaction records 212 corresponding to all locations in the application code 202 which potentially satisfy the dynamic pointcut expression 2042. Each satisfaction record 212 includes an indicator as to whether an associated location in the application code 202 does or does not actually satisfy the dynamic pointcut expression 212. Such information is valuable to developers of application code 202 and aspect code 204 to inform their understanding of how aspect code 204 affects application code 202 when linked and executed.

Figure 4:
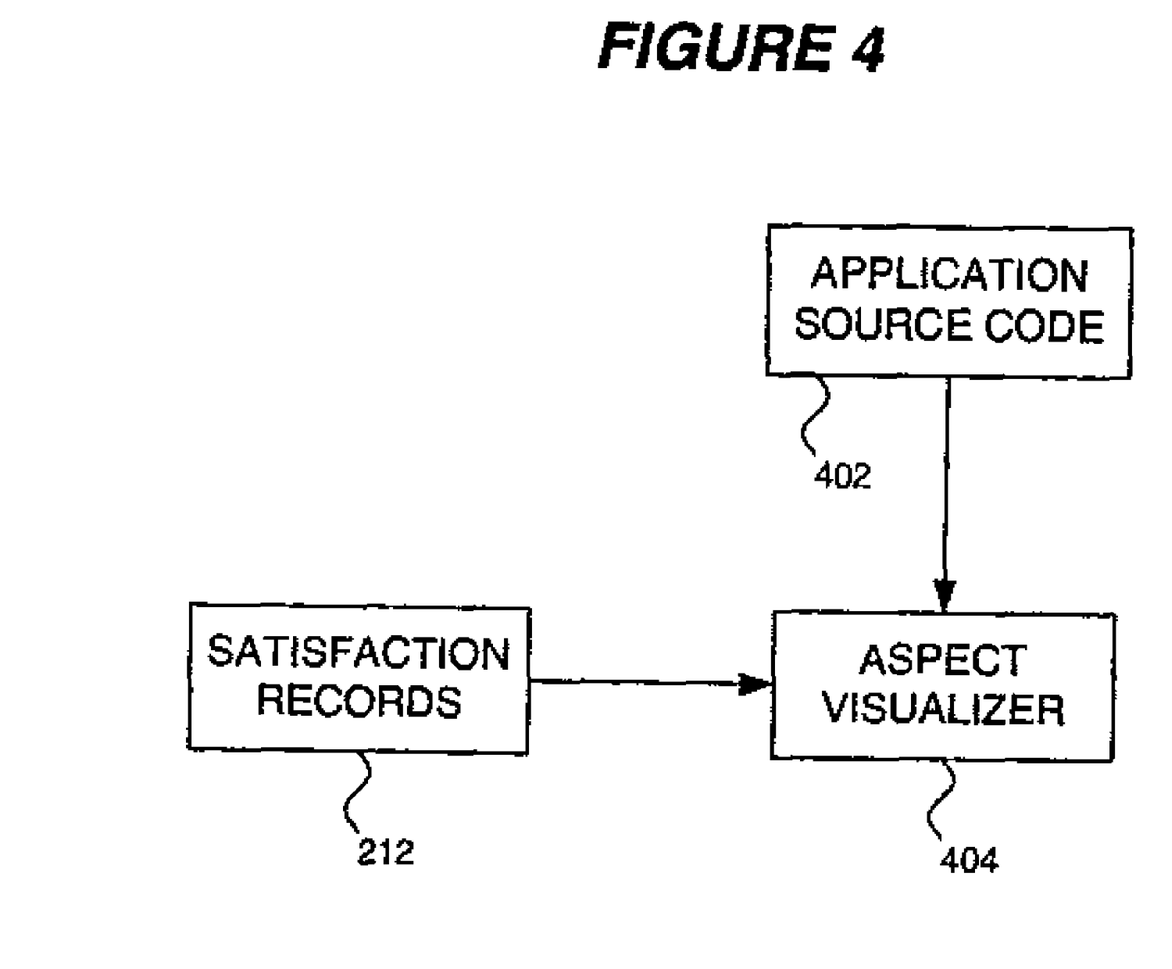
FIG. 4 is a block diagram illustrating a visualization component for providing a visualization of the satisfaction records of FIG. 2 corresponding to locations in application source code in accordance with a preferred embodiment of the present invention.

FIG. 4 is a block diagram illustrating a visualization component 404 for providing a visualization of the satisfaction records 212 of FIG. 2 corresponding to locations in application source code 402 in accordance with a preferred embodiment of the present invention. For example, the visualization component 404 is a component of an integrated development environment for indicating to a software developer which locations in the application code 202 actually satisfy the dynamic pointcut expression 2042 at runtime and which locations do not satisfy the dynamic pointcut expression 2042. The visualization component 404 can be operable during the execution of the woven application runtime 208 to allow a developer to see where the execution of the application has reached, and where and why the dynamic pointcut expression 2042 is satisfied in the application code 202. Thus, the visualization component 404 can provide a real time visualization as the application runs. Alternatively, the satisfaction records 212 can be written to a log file or other data store for subsequent analysis, either manually or using an analysis tool.

Figure 5:
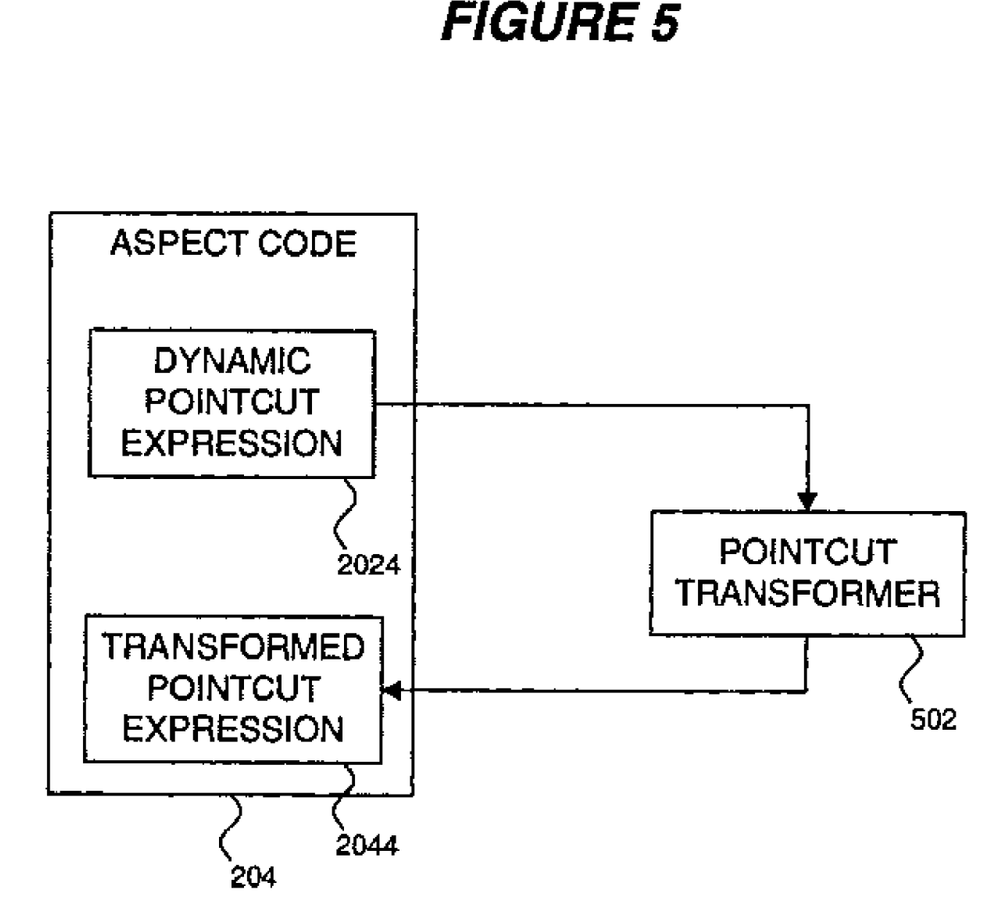
FIG. 5 illustrates a pointcut transformer for transforming a dynamic pointcut expression into a transformed pointcut expression in accordance with a preferred embodiment of the present invention.

One exemplary approach for providing the required monitoring of the execution of a software application includes the use of the aspect linker to provide such functionality. FIG. 5 illustrates a pointcut transformer 502 for transforming a dynamic pointcut expression 2042 into a transformed pointcut expression 2044 in accordance with a preferred embodiment of the present invention. The pointcut transformer 502 is a software or hardware component suitable for generating the transformed pointcut expression 2042 which is logically identical to the dynamic pointcut expression 2042. The logical identity of the pointcut expressions 2042 and 2044 manifests in that both of the pointcut expressions 2042 and 2044 will be satisfied at the same locations in the application code 202. The pointcut transformer 502 generates the transformed pointcut expression 2044 to include a mechanism for the woven application code 208 to generate dynamic pointcut satisfaction records 212 at application execution time. For example, the pointcut transformer 502 can include a dependency upon an evaluation of a static method within which satisfaction records 212 can be generated. This will now be considered in more detail by way of example.

Below is defined an exemplary dynamic pointcut expression having associated advice. The pointcut expression is satisfied by the execution of methods called "test" which take an object parameter that are instances of the "Foo" class. Because the instance of a particular object may not be determinable until application execution time the pointcut expression is a dynamic pointcut expression.

```
before(Foo f) : execution(* test (..)) && args(f) {
    // some advice
}
```

The pointcut transformer 502 then performs a transformation of the dynamic pointcut expression such that references to the Foo class are generalized to Object, and an additional element is added to the pointcut, using an associated static method "isInstanceOf". Thus, this transformed pointcut expression is logically identical to the original pointcut expression. However, the introduction of a static method to make a final determination as to the satisfaction of the pointcut expression provides an opportunity within the linked application code to generate satisfaction records.

```
before(Object f) : execution(* test (..)) && args(f) &&
if(isInstanceOf(f, Foo.class)){
}
static boolean isInstanceOf(Object f, Class c) {
    return c.isInstance(f);
}
```

Thus, the transformed pointcut expression when linked with application code by the aspect linker will constitute the execution monitor. For example, the static method "isInstanceOf" can be augmented to include the generation of satisfaction records as illustrated below:

```
static boolean isInstanceOf(Object f, Class c) {
    boolean ans = c.isInstance(f);
    if (ans=true) {
        // generate satisfaction record indicating that
        // the application satisfied the dynamic pointcut
        // expression at the current location
    } else {
        // generate satisfaction record indicating that
        // the application did not satisfy the dynamic pointcut
        // expression at the current location
    }
    return ans;
}
```

The example above covers the use of the "args" pointcut designator. Other such designators in AspectJ include "target", "this", and "cflow", for which similar monitoring aspects can be generated. These designators can also be used in combination, which would require the multiple transformations to be combined.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable element providing program code for use by or in connection with a computer or any instruction execution system. For the purposes of this description, a computer-usable or computer readable element can be any apparatus that can contain, store, communicate, propagate, or transport the program for use by or in connection with the instruction execution system, apparatus, or device.

The element can be an electronic, magnetic, optical, electromagnetic, infrared, or semiconductor system, (or apparatus or device) or a propagation medium. Examples of a computer-readable element include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description but is not intended to exhaust or limit the invention in the form disclosed. Many modifications and variations will be apparent to those of ordinary skill in the art. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A method for generating one or more satisfaction records for a dynamic pointcut expression in an aspect-oriented software application, the dynamic pointcut expression including at least one criterion relating to the aspect-oriented software application wherein the satisfaction of the criterion can be determined only at execution time of the aspect-oriented software application, the method comprising the steps of:
   analyzing, by aspect code linked to the aspect-oriented software application by an aspect linker, the aspect-oriented software application to generate a first set of locations in the aspect-oriented software application where the at least one criterion is potentially satisfied, wherein the first set of locations are join points that could be matched by the dynamic pointcut expression when the aspect-oriented software application is executed;
   executing the aspect-oriented software application;
   monitoring, by the aspect code linked to the aspect-oriented software application by the aspect linker, the aspect-oriented software application to generate a second set of locations in the aspect-oriented software application where the at least one criterion is actually satisfied, wherein the second set of locations are join points that are actually matched by the dynamic pointcut expression when the aspect-oriented software application is executed;
   for each location in the second set of locations generating, by the aspect code linked to the aspect-oriented software application by the aspect linker, a satisfaction record indicating that the aspect-oriented software application satisfied the at least one criterion at the location; and
   for each location in the first set of locations not in the second set of locations generating, by the aspect code linked to the aspect-oriented software application by the aspect linker, a satisfaction record indicating that the aspect-oriented software application did not satisfy the at least one criterion at the location.

2. The method of claim 1 further comprising the step of providing an identifier in source code for the aspect-oriented software application for each one of the satisfaction records at a location in the source code corresponding to the satisfaction record.

3. The method of claim 2 wherein each identifier includes a corresponding satisfaction record indicator.

4. A system for generating one or more satisfaction records for a dynamic pointcut expression in an aspect-oriented software application, the dynamic pointcut expression including at least one criterion relating to the aspect-oriented software application wherein the satisfaction of the criterion can be determined only at execution time of the aspect-oriented software application, the system comprising:
   a storage having computer usable instructions encoded thereon for generating one or more satisfaction records for the dynamic pointcut expression in the aspect-oriented software application;
   a bus connecting the storage to a processor; and
   a processor, wherein the processor executes the computer usable instructions:
   to analyze, by aspect code linked to the aspect-oriented software application by an aspect linker, the aspect-oriented software application to generate a first set of locations in the aspect-oriented software application where the at least one criterion is potentially satisfied, wherein the first set of locations are join points that could be matched by the dynamic pointcut expression when the aspect-oriented software application is executed;
   to execute the aspect-oriented software application;
   to monitor, by the aspect code linked to the aspect-oriented software application by the aspect linker, the aspect-oriented software application to generate a second set of locations in the aspect-oriented software application where the at least one criterion is actually satisfied, wherein the second set of locations are join points that are actually matched by the dynamic pointcut expression when the aspect-oriented software application is executed;
   for each location in the second set of locations, to generate, by the aspect code linked to the aspect-oriented software application by the aspect linker, a satisfaction record indicating that the aspect-oriented software application satisfied the at least one criterion at the location; and
   for each location in the first set of locations not in the second set of locations, to generate, by the aspect code linked to the aspect-oriented software application by the aspect linker, a satisfaction record indicating that the aspect-oriented software application did not satisfy the at least one criterion at the location.

5. The system of claim 4 wherein the processor executes the computer usable instructions to provide an identifier in source code for the aspect-oriented software application for each one of the satisfaction records at a location in the source code corresponding to the satisfaction record.

6. The system of claim 5 wherein each identifier includes a corresponding satisfaction record indicator.

7. A computer program product comprising: a non-transitory computer readable storage medium having a computer usable instructions encoded thereon for generating one or more satisfaction records for a dynamic pointcut expression in an aspect-oriented software application, the dynamic pointcut expression including at least one criterion relating to the aspect-oriented software application wherein the satisfaction of the criterion can be determined only at execution time of the aspect-oriented software application:

instructions for analyzing, by aspect code linked to the aspect-oriented software application by an aspect linker, the aspect-oriented software application to generate a first set of locations in the aspect-oriented software application where the at least one criterion is potentially satisfied, wherein the first set of locations are join points that could be matched by the dynamic pointcut expression when the aspect-oriented software application is executed;

instructions for executing the aspect-oriented software application;

instructions for monitoring, by the aspect code linked to the aspect-oriented software application by the aspect linker, the aspect-oriented software application to generate a second set of locations in the aspect-oriented software application where the at least one criterion is actually satisfied, wherein the second set of locations are join points that are actually matched by the dynamic pointcut expression when the aspect-oriented software application is executed;

for each location in the second set of locations instructions for generating, by the aspect code linked to the aspect-oriented software application by the aspect linker, a satisfaction record indicating that the aspect-oriented software application satisfied the at least one criterion at the location; and for each location in the first set of locations not in the second set of locations, instructions for generating, by the aspect code linked to the aspect-oriented software application by the aspect linker, a satisfaction record indicating that the aspect-oriented software application did not satisfy the at least one criterion at the location.

8. The computer program product of claim 7 further comprising instructions for providing an identifier in source code for the aspect-oriented software application for each one of the satisfaction records at a location in the source code corresponding to the satisfaction record.

9. The computer program product of claim 8 wherein each identifier includes a corresponding satisfaction record indicator.

* * * * *